Oct. 16, 1928.

G. R. BRANNER

ANIMAL COLLAR

Filed Aug. 4, 1927

1,688,261

George R. Branner, INVENTOR

BY Victor J. Evans ATTORNEY

WITNESS:

Patented Oct. 16, 1928.

1,688,261

UNITED STATES PATENT OFFICE.

GEORGE R. BRANNER, OF DAYTONA, FLORIDA.

ANIMAL COLLAR.

Application filed August 4, 1927. Serial No. 210,599.

This invention relates to collars for dogs and other animals, an object being to provide a collar which when worn by an animal will prevent the spread of such diseases as mange, to which dogs are especially susceptible.

To this end, the invention provides a collar having a metallic lining which contacts with the neck of the animal and which consists of copper, found as the result of repeated tests to be highly efficient in the treatment of mange.

With the above and other objects in view, the invention further includes the following novel features and details of construction, to be hereinafter more fully described, illustrated in the accompanying drawings and pointed out in the appended claims.

In the drawings:—

Figure 1:
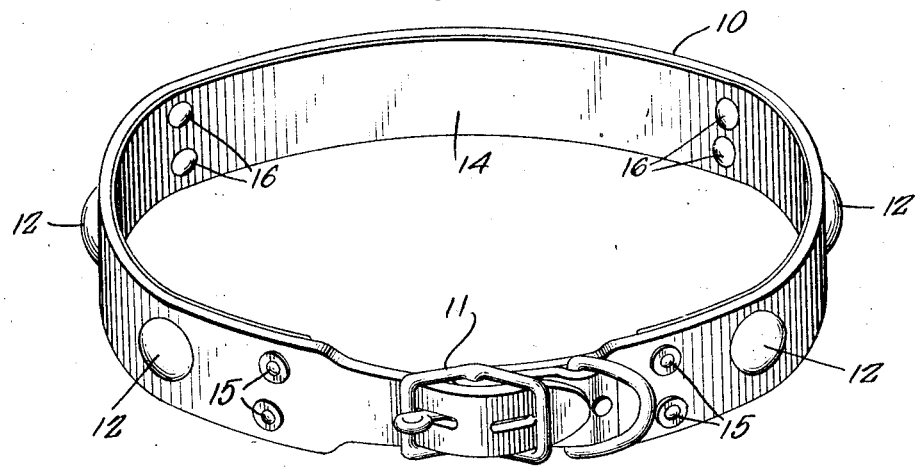
Figure 1 is a perspective view of a collar constructed in accordance with the invention.
Figure 2:
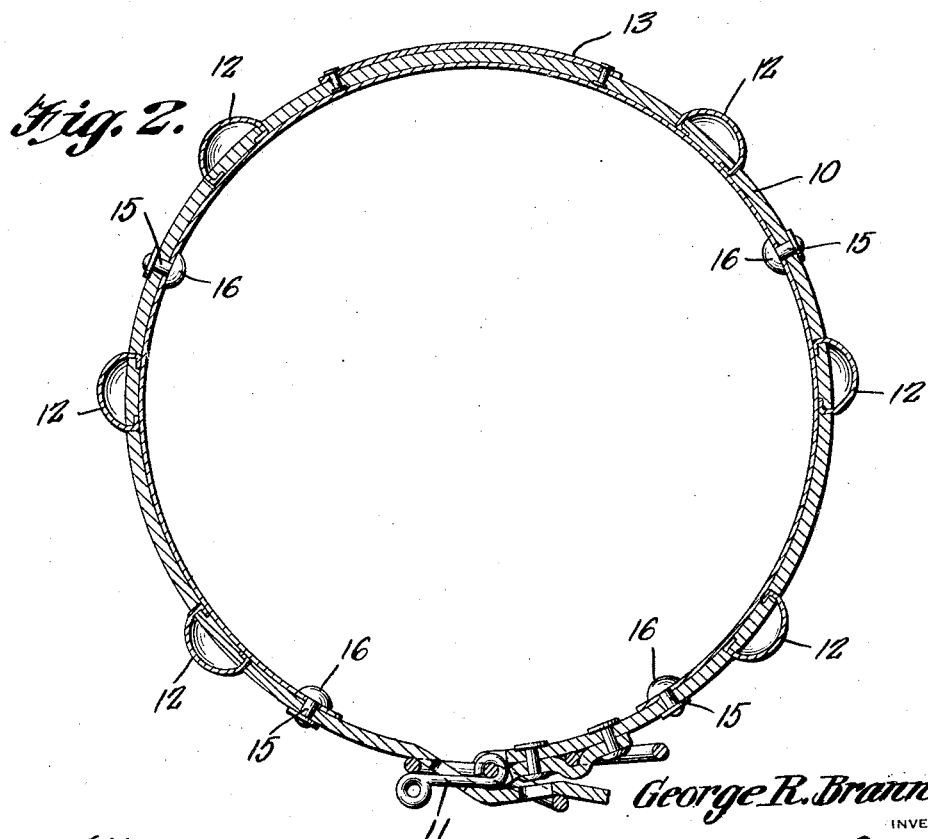
Figure 2 is a sectional view of the same.

Referring to the drawings in detail wherein like characters of reference denote corresponding parts, the reference character 10 indicates the collar which may be made of leather or other suitable material and which may be provided with a buckle 11, whereby the ends of the collar may be connected. The collar may also be provided with suitable ornaments 12 and with a plate 13 to receive the name of the animal, or the name and address of the owner.

The invention resides in securing a metal lining 14 within the collar. This lining is preferably of copper and is secured in place by means of rivets 15, the latter being preferably provided with rounded heads 16 which project beyond the face of the lining and which will provide spaced points of contact with the neck of the animal. Positive contact with the neck of the animal may be thus assured without requiring a tight adjustment of the collar around the animal's neck. The copper lining 14 is chemically treated, when desired, but not necessarily so, and when the lining 14 or the rivet heads 16 contact with the neck of the animal, a chemical action is set up which will kill and prevent the spread of the mange or other like disease.

The invention is susceptible of various changes in its form, proportions and minor details of construction and the right is herein reserved to make such changes as properly fall within the scope of the appended claims.

Having described the invention what is claimed is:—

1. In an animal collar, a copper lining, copper rivets extending through the collar and lining to secure the latter in place, and rounded heads upon the ends of the rivets with the heads extending beyond the face of the lining for contact with the neck of an animal.

2. In an animal collar, a lining formed from copper and secured to the collar in a manner to contact with the neck of an animal.

3. A mange treating appliance for animals, including an element of copper, and means for mounting said element in position for contact with the hair and skin of the animal.

In testimony whereof I affix my signature.

GEORGE R. BRANNER.